United States Patent [19]
Rühl et al.

[11] Patent Number: 4,618,521
[45] Date of Patent: Oct. 21, 1986

[54] CORROSION PROTECTION SHEET

[75] Inventors: Karl Rühl, Bad Nauheim; Karlheinz Bildner, Rodenbach, both of Fed. Rep. of Germany

[73] Assignee: Rütgerswerke Aktiengesellschaft, Frankfurt, Fed. Rep. of Germany

[21] Appl. No.: 692,751

[22] Filed: Jan. 18, 1985

[30] Foreign Application Priority Data

Feb. 1, 1984 [DE] Fed. Rep. of Germany ....... 3403407

[51] Int. Cl.$^4$ .................... B32B 11/02; B32B 3/10
[52] U.S. Cl. ..................... 428/137; 428/219; 428/220; 428/349; 428/489; 428/497; 428/518
[58] Field of Search ............. 428/137, 219, 220, 349, 428/489, 497, 518; 524/68; 106/14.34

[56] References Cited

U.S. PATENT DOCUMENTS 4,282,127  8/1981  Desgouilles ........................... 524/68
4,473,606  9/1984  Ruhl et al. ....................... 428/131 X Primary Examiner—Alexander S. Thomas
Attorney, Agent, or Firm—Beveridge, DeGrandi & Weilacher

[57] ABSTRACT

A corrosion protective sheet for adhesion to steel sheets which is made from elastomers and natural resin modified bitumen and which contains up to about 10% organic and or inorganic fibrous material. The sheet is coated on the underside with a melt adhesive and on the upper side with a bitumen resistant anti-block material which provides a solid sheet at a temperature under 90° C. No separation sheets are needed and the adherence of the sheet on the steel surface to be protected is improved and the upper surface is rendered resistant to penetration.

6 Claims, 1 Drawing Figure

U.S. Patent        Oct. 21, 1986        4,618,521
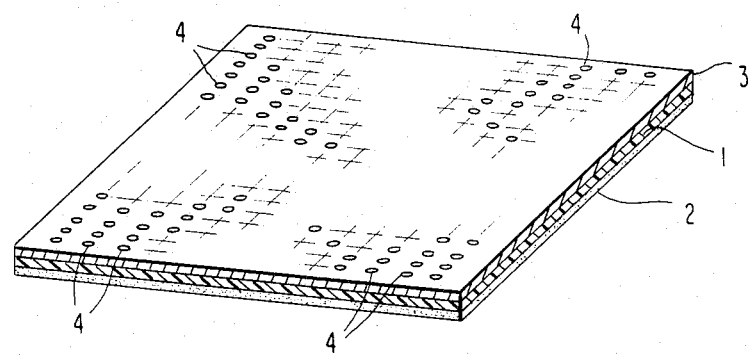

CORROSION PROTECTION SHEET

It is the object of the present invention to provide a perforated meltable sheet for the protection against corrosion of steel sheets, especially in the manufacture of motor vehicles.

It is conventionally known in coat parts of motor vehicles such as for example the undercarriage of the automobile body with heavy sheets of bituminous material. These sheets fulfill two functions: they operate to dampen noise and at the same time are intended to assure corrosion protection. The coating of the motor vehicle parts is carried out at about 120° C. The sheets are sufficiently softened at that temperature so that they can conform to the shape and configuration of the steel sheet and securely adhere to them. In recent times, however, it is considered a disadvantage that the surface weight of these sheets is high; namely, 3 to 4 kg/m$^2$.

In light of the energy conservation measures therefore, new practicable and lighter anti-noise systems were developed which, however, no longer completely cover the parts of the motor vehicle which are to be sound dampened and therefore the ability to perform as corrosion protection means could no longer be accomplished.

In the German OS No. 31 41 539 corresponding to U.S. Pat. No. 4,473,606 which is relied on and incorporated herein by reference, there is provided as a solution to this problem a lightweight perforated corrosion protection sheet, which is capable of bonding to a steel sheet in 30 minutes at a temperature between 100° and 150° by softening and flowing onto the provided steel surface and thereupon adhere to the steel, and which possess a thermal resistance of a minimum of 160° C. as well as a sufficient resistance to cold at −40° C. The bottom plate of a car is provided with reinforcing seams. During the heating step the anti-corrosion sheet softens and covers the plate completely without blister formation. The included gas can escape through the perforations. After this, the perforations are completely filled with the softening bituminous material. The composition of U.S. Pat. No. 4,473,606 consists of a mixture of: 60 to 90% by weight bitumen, for example B100/25, 0.5 weight percent SBR-rubber,
5 to 25 weight percent of an elastomer modified bitumen,
0.5 to 7.5 weight percent of a natural resin, and
0.5 to 10 weight percent of a organic or inorganic fibrous material which can withstand temperatures of over 160° C.

The bitumen is an air blown bitumen, which has a needle penetration of 20 to 35 at 25° C. in 0.1 mm, and a softening point between 75° and 110° C. in the ring and ball test.

The SBR-rubber is a styrene-butadiene copolymer with butadiene/styrene ratio between 60 to 40 and 70 to 30.

For use as the elastomer modified bitumen, there may be used a primary bitumen, which has a needle penetration in the range of 70 to 210 at 25° C. in 0.1 mm with a softening point between 37° and 49° C. in the ring and ball test, and which is modified with a small but effective amount and up to 30% by weight of a polymer. Suitable polymers are polyisobutene, polybutene, polyethylene, atactic polypropylene, styrenebutadiene rubbers and SBR-rubbers.

Suitable natural resins which can be used for purposes of the invention are Chinese balsam resin, rosin of pine roots and wood rosin of different origin. These are well known in the art.

Inorganic and organic fibers may be used for purposes of the invention which do not melt below 160° C. with a length up to 3 mm can be used; e.g. polyester fibers and glass or rock fibers.

In the construction of the known sheet, there is placed on one side thereof a separation or parting sheet, for example, a silicon paper is laminated thereon in order to avoid the sticking together of the superimposed sheets during storage of the anti-corrosion sheets. The separation sheet must be separated from the corrosion protection sheet prior to the application of said sheet to the steel surface which is to be protected. Because of that, there is not only an additional procedural step necessary but also there arises the additional problem of the disposal of the waste material. In addition, it follows that because of the actually purposeless and unnecessary lamination of the sheets this results in a not inconsiderable increase in expense. There is additionally observed as a disadvantage of this known sheet, that the outside surface is not sufficiently solid to be stepped on and indeed the bituminous material will partially adhere to the shoe soles of persons encountering or walking over the sheets and this results in the soiling of floor surfaces in the work place.

It is the object of the invention to provide an improved corrosion protective sheet which avoids the above noted disadvantages. This object is obtained according to the invention by means of a corrosion protective sheet which is provided on the underside thereof with a meltable adhesive (2), which forms a solid sheet at a temperature below 90° C., which has a melting point between 120° and 160° and which will withstand bitumen and on the upper surface which is coated with a bitumen resistant anti-block material (3) which also at a temperature below 90° C. produces a composite protection sheet.

As the meltable adhesive (2), there is preferably used a dispersion based on vinylchoride polymer. The vinylchloride polymer is a copolymer of vinylchloride, vinylacetate and ethylene without plasticiser, which has a melting point between 90° and 160° C. It is used in the form of a dispersion with about 50% water. The vinylacetate content should be more than 10% in order to improve the solubility. Such polymers are known in the art and a variety of these available materials may be used. The dispersion is applied to the sheet layer (1) by spraying, brushing or with an application roller to form a thin layer. The anti-blocking material (3) retards not only the sticking together of the corrosion protective sheets during storage but also serves at the same time as a penetration resistant oversheet protection. It is formed from a polymer sheet preferably from a silicon basis or on the basis of vinylchloride polymer. In layer (3), a low temperature silicon rubber (RTV 1) can be used instead of the vinylchloride polymer dispersion. In both layers (2) and (3), waxes such as hard micro waxes with a softening point above 50° C. up to 160° C. can be used also instead of the vinylchloride polymer dispersion.

In a preferred embodiment of the invention, the corrosion protective sheet is coated with a vinylchloride polymer dispersion on both sides. The perforations (4) have a hole size of 0.5 to 3 mm with a clearance between hole of 5 to 50 mm. The sheet is perforated by punch means, after both sides are coated from the top to the bottom. Otherwise, the included gas could not escape during the heating step, when the sheet is applicated on the metal substrate. The corrosion protective sheet ranges from 1000 kg/m$^2$ and the thickness is preferably 0.8 to 1.5 mm.

In the drawing, there is shown a corrosion resistant sheet in accordance with the invention. It consists of a sheet (1) made from a natural resin and elastomeric modified bitumen which additionally contains organic and/or inorganic fibers. This sheet is formed in accordance with the composition disclosed in German OS No. 31 41 539 (U.S. Pat. No. 4,473,606). On the underside, it is provided with a melt adhesive material (2) and on the upper side with an anti-blocking material (3) and is further provided with a multiplicity of perforations (4). The plastic bituminous material is very sticky. Therefore, it has to be coated on both sides with an anti-adhesive layer. The layer (2) must be a melt adhesive to bond the sheet with the metal substrate during the heating step. Layer (3) can be formed of the same material, because it need only prevent the bituminous material from sticking at essentially ambient temperatures before and after the heating step.

With the formulation provided herein, it is a further advantage of the sheet of the present invention that because of the meltable adhesive (2), the adhesion of the corrosion protection material on the steel sheet which is intended to be protected is improved.

Further variations and modifications of the invention will be apparent to those skilled in the art from the foregoing and are intended to be encompassed by the claims appended hereto.

The German priority application No. P 34 03 407.2 is relied on and incorporated herein by reference.

We claim:

1. A corrosion protective sheet provided with perforations for the application by melting to steel surfaces at a temperature of 120° to 160° C. within 30 minutes which has a resistance to temperature in a range of −40° to 160° C. comprising a mixture of 60 to 90 weight percent bitumen, 0.5 to 7 weight percent SBR-rubber, 5 to 25 weight percent elastomeric modified bitumen, 0.5 to 7.5 weight percent natural resin and 0.5 to 10 weight percent of an organic or inorganic fibrous material which is resistant to a temperature of up to 160° C., and provided on the underside with a meltable adhesive (2) which exists as a solid sheet at a temperature under 90° C. and has a melting temperature between 120° and 160° C. and which is resistant to bitumen and having on the upper side a bitumen resistant anti-block material (3) which also is solid at a temperature under 90° C.

2. The corrosion protective sheet according to claim 1 further comprising said sheet having a density of 1000 to 1100 kg/m$^3$ and a thickness of 0.8 to 1.5 mm.

3. The corrosion protective sheet according to claim 2 further comprising wherein the perforations have a hole diameter of 0.5 to 3 mm and are spaced 5 to 50 mm apart.

4. The corrosion protective sheet according to claim 1 further comprising that the perforations have a dimension of 0.5 to 3 mm and are spaced from 5 to 50 mm apart.

5. The corrosion protective sheet in accordance with claim 1 further comprising said meltable adhesive sheet is a vinylchloride polymer.

6. The corrosion protective sheet in accordance with claim 1 further comprising said anti-block material being a sheet of vinylchloride polymer.

* * * * *